United States Patent
Luo et al.

(10) Patent No.: US 12,198,435 B2
(45) Date of Patent: Jan. 14, 2025

(54) VIDEO HIGHLIGHT EXTRACTION METHOD AND SYSTEM, AND STORAGE MEDIUM

(71) Applicant: Beijing LingoAce Technology Co., Ltd., Beijing (CN)

(72) Inventors: Guan Luo, Beijing (CN); Chaochen Wu, Beijing (CN); Chun Ling, Beijing (CN); Yanjie Zhong, Beijing (CN)

(73) Assignee: Beijing LingoAce Technology Co., Ltd., Beijing (CN)

( * ) Notice: Subject to any disclaimer, the term of this patent is extended or adjusted under 35 U.S.C. 154(b) by 361 days.

(21) Appl. No.: 17/669,429

(22) Filed: Feb. 11, 2022

(65) Prior Publication Data
US 2023/0110002 A1    Apr. 13, 2023

(30) Foreign Application Priority Data
Oct. 8, 2021   (CN) .......................... 202111169577.1

(51) Int. Cl.
*G06V 20/00*    (2022.01)
*G06V 20/40*    (2022.01)
(Continued)

(52) U.S. Cl.
CPC ............ *G06V 20/46* (2022.01); *G06V 40/169* (2022.01); *G06V 40/176* (2022.01); *G06V 40/20* (2022.01);
(Continued)

(58) Field of Classification Search
CPC .... G06V 20/46; G06V 40/169; G06V 40/176; G06V 40/20; G06V 10/806; G06V 20/41;
(Continued)

(56) References Cited

U.S. PATENT DOCUMENTS

2010/0028846 A1* 2/2010 Cohen ...................... G09B 5/00
434/323
2010/0291528 A1* 11/2010 Huerta ..................... G09B 7/00
434/362
(Continued)

FOREIGN PATENT DOCUMENTS

CN        109889920 A    *    6/2019

OTHER PUBLICATIONS

Sirkin et al., "Motion and Attention in a Kinetic Videoconferencing Proxy", Sep. 5, 2011 (Sep. 5, 2011 ), SAT 2015 18th International Conference, Austin, TX, USA, Sep. 24-27, 2015; Springer, Berlin, Heidelberg, pp. 162-180. (Year: 2011).*

*Primary Examiner* — Van D Huynh
(74) *Attorney, Agent, or Firm* — Sand, Sebolt & Wernow Co., LPA

(57) ABSTRACT

The present disclosure relates to a video highlight extraction method and system, and a storage medium. The method includes: obtaining a to-be-processed online class video and a teacher-student interaction feature and dividing the to-be-processed online class video into a plurality of target videos; respectively analysis on pictures corresponding to all frames of a target video, to obtain a visual feature set of a student and a visual feature set of a teacher in the pictures corresponding to the frames; determining timeliness of student feedback; performing speech recognition on the speech segment corresponding to the student and the speech segment corresponding to the teacher and extracting a key word, to determine fluency of language of the teacher, fluency of language of the student, and correctness of teaching knowledge; and determining a highlight in the to-be-processed online class video according to priorities of the target videos.

12 Claims, 3 Drawing Sheets

(51) Int. Cl.
- *G06V 40/16* (2022.01)
- *G06V 40/20* (2022.01)
- *G10L 15/00* (2013.01)
- *G10L 15/08* (2006.01)

(52) U.S. Cl.
CPC ............ *G10L 15/005* (2013.01); *G10L 15/08* (2013.01); *G10L 2015/088* (2013.01)

(58) Field of Classification Search
CPC ........ G06V 20/49; G06V 20/52; G06V 40/18; G10L 15/005; G10L 15/08; G10L 2015/088; G10L 15/04; G10L 15/26; G06F 18/253; G06N 3/08; G06N 3/045
See application file for complete search history.

(56) References Cited

U.S. PATENT DOCUMENTS

| | | | |
|---|---|---|---|
| 2011/0167013 A1* | 7/2011 | Pogue | G09B 7/00 705/326 |
| 2013/0258042 A1* | 10/2013 | Shun | H04N 7/152 348/E7.083 |
| 2020/0379575 A1* | 12/2020 | Banerjee | G06F 3/012 |
| 2022/0254158 A1* | 8/2022 | Sun | G06V 40/23 |
| 2022/0319181 A1* | 10/2022 | Kanuganti | G09B 7/02 |
| 2022/0327946 A1* | 10/2022 | Rushkin | G09B 5/02 |
| 2023/0110002 A1* | 4/2023 | Luo | G06V 20/46 382/103 |
| 2023/0177878 A1* | 6/2023 | Sekar | G06F 40/40 382/103 |
| 2023/0222932 A1* | 7/2023 | Zhou | G06F 3/013 |

\* cited by examiner

VIDEO HIGHLIGHT EXTRACTION METHOD AND SYSTEM, AND STORAGE MEDIUM

CROSS REFERENCE TO RELATED APPLICATION

This patent application claims the benefit and priority of Chinese Patent Application No. 202111169577.1, filed on Oct. 8, 2021, the disclosure of which is incorporated by reference herein in its entirety as part of the present application.

TECHNICAL FIELD

The present disclosure relates to the field of video analysis and clipping, and in particular, to a video highlight extraction method and system, and a storage medium.

BACKGROUND ART

With the development of the online classroom technology, students, teachers, and course salespeople hope to evaluate and publicize highlights in the classroom through short videos. Because manual clipping is time-consuming, a clipping standard is not clear, and the quality of clipped content is greatly affected by human factors, educational services also hope to make a course collection by using an automatic method to publicize courses, so as to reduce the costs of manual clipping. Existing automatic video clipping technologies include: an end-to-end video clipping method through a neural network. Such method is applicable to videos with rapidly changing scenes, such as movies, but the end-to-end clipping models have low interpretability for online class videos emphasizing course content, and as requirements for the video change, the model needs to be retrained, resulting in huge workload and high costs.

SUMMARY

An objective of the present disclosure is to provide a video highlight extraction method and system, and a storage medium, so that relatively strong interpretability is achieved, and a user conveniently adjusts a parameter as required.

To implement the above objectives, the present disclosure provides the following solutions.

A video highlight extraction method is provided, including:

obtaining a to-be-processed online class video and a teacher-student interaction feature, and dividing the to-be-processed online class video into a plurality of target videos, where the teacher-student interaction feature includes a reward and a punishment of a teacher to a student at each moment in the to-be-processed online class video;

for any target video, respectively performing facial expression analysis, eye movement attention analysis, and gesture and body movement analysis on pictures corresponding to all frames of the target video, to obtain a visual feature set of the student and a visual feature set of the teacher in the pictures corresponding to the frames, where the visual feature set includes an expression feature, an eye ball position feature, an eye aspect ratio feature, a gesture feature, a body movement feature, and an attention feature;

determining timeliness of student feedback according to a time interval between a speech segment corresponding to the student and a speech segment corresponding to the teacher in audio of the target video;

performing speech recognition on the speech segment corresponding to the student and the speech segment corresponding to the teacher and extracting a key word, to determine fluency of language of the teacher, fluency of language of the student, and correctness of teaching knowledge; and determining a highlight in the to-be-processed online class video according to priorities of the target videos, where the priority is a weighted sum of frequencies of occurrence of features of a feature set in the target video and/or a weighted sum of probability density of occurrence of features of a feature set in the target video, and the feature set includes the teacher-student interaction feature, the visual feature set of the teacher, the visual feature set of the student, the timeliness of the student feedback, the fluency of the language of the teacher, the fluency of the language of the student, and the correctness of the teaching knowledge.

Optionally, the respectively performing facial expression analysis, eye movement attention analysis, and gesture and body movement analysis on pictures corresponding to all frames of the target video, to obtain a visual feature set of the student and a visual feature set of the teacher in the pictures corresponding to the frames specifically includes:

reading the target video frame by frame, to obtain the pictures corresponding to all the frames of the target video;

for any picture, respectively performing the facial expression analysis, the eye movement attention analysis, and the gesture and body movement analysis on a first setting region in the picture, to obtain the visual feature set of the teacher corresponding to the picture; and respectively performing the facial expression analysis, the eye movement attention analysis, and the gesture and body movement analysis on a second setting region in the picture, to obtain the visual feature set of the student corresponding to the picture.

Optionally, the determining timeliness of student feedback according to a time interval between a speech segment corresponding to the student and a speech segment corresponding to the teacher in audio of the target video specifically includes:

extracting audio in the to-be-processed online class video;

performing voice activity detection on the audio, to obtain a plurality of speech segments;

performing identity recognition on each speech segment, to obtain an identity corresponding to each speech segment; and determining the timeliness of the student feedback according to the time interval between the speech segment corresponding to the student and the speech segment corresponding to the teacher.

Optionally, the performing speech recognition on the speech segment corresponding to the student and the speech segment corresponding to the teacher and extracting a key word, to determine fluency of language of the teacher, fluency of language of the student, and correctness of teaching knowledge specifically includes:

respectively performing speech recognition on the speech segment corresponding to the student and the speech segment corresponding to the teacher, to obtain a text corresponding to the student and a text corresponding to the teacher;

extracting a key word in the text corresponding to the teacher;

determining the fluency of the language of the teacher according to the key word;

determining the correctness of the teaching knowledge according to the text corresponding to the student; and determining the fluency of the language of the student according to the speech segment corresponding to the student.

Optionally, the determining a highlight in the to-be-processed online class video according to priorities of the target videos specifically includes:

for any target video, calculating a weighted sum of frequencies of occurrence of features of a feature set in the target video or a weighted sum of probability density of occurrence of features of a feature set in the target video; and determining a target video corresponding to a target priority as the highlight, where the target priority is a weighted sum with a value in a set range.

A video highlight extraction system is provided, including:

an obtaining module, configured to obtain a to-be-processed online class video and a teacher-student interaction feature, and divide the to-be-processed online class video into a plurality of target videos, where the teacher-student interaction feature includes a reward and a punishment of a teacher to a student at each moment in the to-be-processed online class video;

a visual feature set determining module, configured to: for any target video, respectively perform facial expression analysis, eye movement attention analysis, and gesture and body movement analysis on pictures corresponding to all frames of the target video, to obtain a visual feature set of the student and a visual feature set of the teacher in the pictures corresponding to the frames, where the visual feature set includes an expression feature, an eye ball position feature, an eye aspect ratio feature, a gesture feature, a body movement feature, and an attention feature;

a timeliness determining module, configured to determine timeliness of student feedback according to a time interval between a speech segment corresponding to the student and a speech segment corresponding to the teacher in audio of the target video;

a fluency and correctness determining module, configured to perform speech recognition on the speech segment corresponding to the student and the speech segment corresponding to the teacher and extract a key word, to determine fluency of language of the teacher, fluency of language of the student, and correctness of teaching knowledge; and a highlight determining module, configured to determine a highlight in the to-be-processed online class video according to priorities of the target videos, where the priority is a weighted sum of frequencies of occurrence of features of a feature set in the target video and/or a weighted sum of probability density of occurrence of features of a feature set in the target video, and the feature set includes the teacher-student interaction feature, the visual feature set of the teacher, the visual feature set of the student, the timeliness of the student feedback, the fluency of the language of the teacher, the fluency of the language of the student, and the correctness of the teaching knowledge.

Optionally, the visual feature set determining module specifically includes:

a picture extraction unit, configured to read the target video frame by frame, to obtain the pictures corresponding to all the frames of the target video;

a teacher-specific visual feature set determining unit, configured to: for any picture, respectively perform the facial expression analysis, the eye movement attention analysis, and the gesture and body movement analysis on a first setting region in the picture, to obtain the visual feature set of the teacher corresponding to the picture; and a student-specific visual feature set determining unit, configured to respectively perform the facial expression analysis, the eye movement attention analysis, and the gesture and body movement analysis on a second setting region in the picture, to obtain the visual feature set of the student corresponding to the picture.

Optionally, the information determination module may specifically include:

an audio extraction unit, configured to extract audio in the to-be-processed online class video;

a speech segment determining unit, configured to perform voice activity detection on the audio, to obtain a plurality of speech segments;

an identity determining unit, configured to perform identity recognition on each speech segment, to obtain an identity corresponding to each speech segment; and a timeliness determining unit, configured to determine the timeliness of the student feedback according to the time interval between the speech segment corresponding to the student and the speech segment corresponding to the teacher.

Optionally, the fluency and correctness determining module specifically includes:

a speech recognition unit, configured to respectively perform speech recognition on the speech segment corresponding to the student and the speech segment corresponding to the teacher, to obtain a text corresponding to the student and a text corresponding to the teacher;

a key word extraction unit, configured to extract a key word in the text corresponding to the teacher;

a teacher fluency determining unit, configured to determine the fluency of the language of the teacher according to the key word;

a correctness determining unit, configured to determine the correctness of the teaching knowledge according to the text corresponding to the student; and a student fluency determining unit, configured to determine the fluency of the language of the student according to the speech segment corresponding to the student.

A storage medium is provided, configured to store the foregoing video highlight extraction method.

According to the specific embodiments provided in the present disclosure, the present disclosure discloses the following technical effects: in the present disclosure, a highlight in a to-be-processed online class video is determined according to priorities of target videos, where the priority is weighted sum of frequencies of occurrence of features of a feature set in the target videos and/or a weighted sum of probability density of occurrence of features of a feature set in the target videos. As requirements change, weights of the features of the feature set can be directly adjusted without retraining a model, so that relatively strong interpretability is achieved, and a user conveniently adjusts parameters as required, thereby obtaining a video segment better meeting the requirements.

BRIEF DESCRIPTION OF THE DRAWINGS

To describe the embodiments of the present disclosure or the technical solutions in the related art more clearly, the accompanying drawings required in the embodiments are briefly introduced below. Obviously, the accompanying drawings described below are only some embodiments of the present disclosure. Those of ordinary skill in the art may further obtain other accompanying drawings based on these accompanying drawings without creative labor.

DETAILED DESCRIPTION OF THE EMBODIMENTS

The technical solutions of the embodiments of the present disclosure are clearly and completely described below with reference to the accompanying drawings. Apparently, the described embodiments are merely some rather than all of the embodiments of the present disclosure. Based on the embodiments of the present disclosure, all other embodiments obtained by the person of ordinary skill in the art without creative efforts shall fall within the protection scope of the present disclosure.

To make the foregoing objective, features, and advantages of the present disclosure clearer and more comprehensible, the present disclosure will be further described in detail below with reference to the accompanying drawings and specific implementations.

Figure 1:
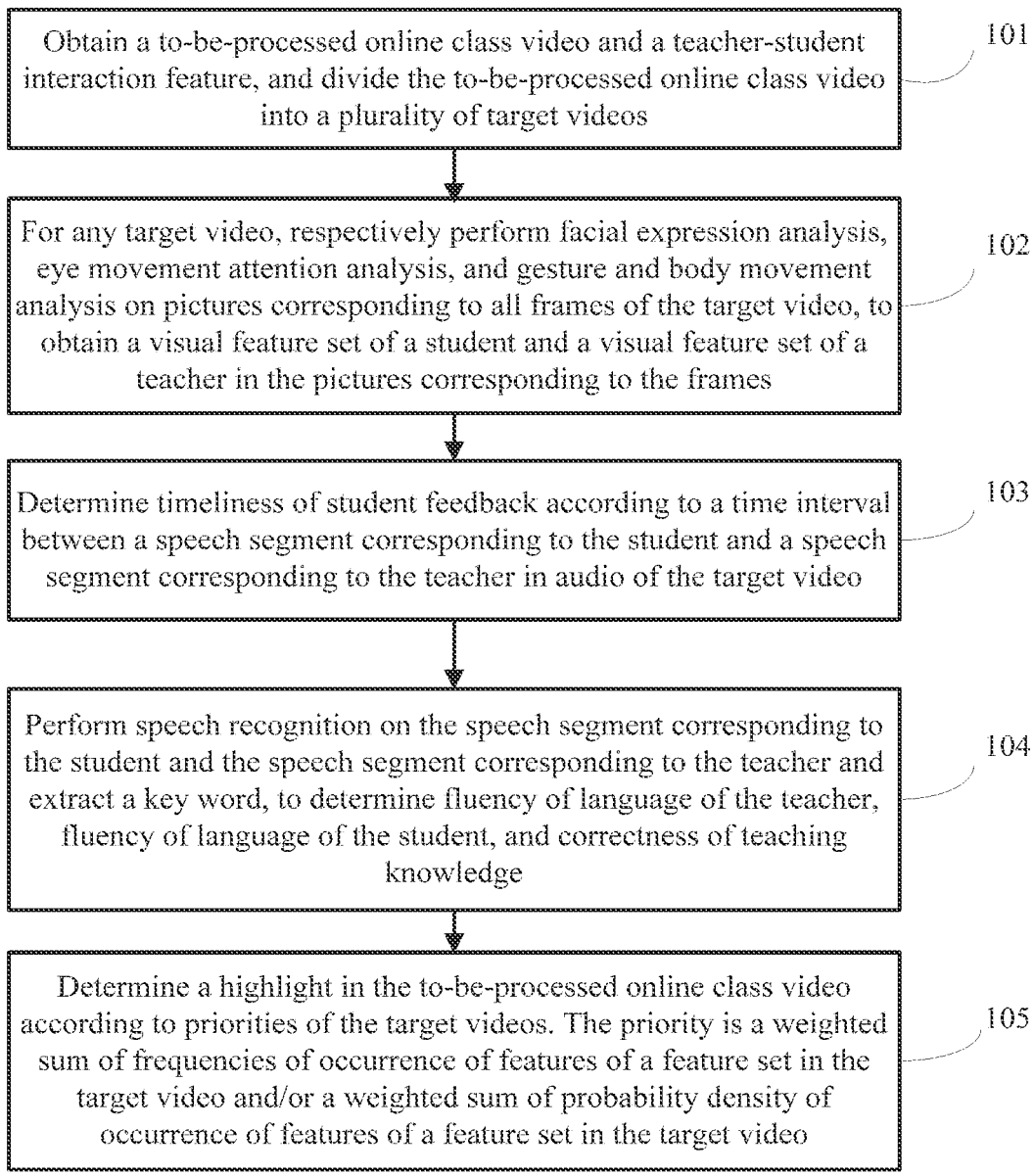
FIG. 1 is a specific flowchart of a video highlight extraction method according to an embodiment of the present disclosure.

To automatically clip a highlight moment, an emotion of a student in a class needs to be recognized first, then the emotion is converted into a form that can be recognized by a machine, and a key frame in a video is found according to a face feature and a sound feature. With the wide development and application of machine learning technologies, a basic feature in a video can be extracted accurately and efficiently through a machine learning method, time points of key frames in the video are calculated according to the basic feature, and the video is automatically clipped according to the time points by using a video clipping tool, to generate a highlight moment. Therefore, this embodiment provides a video highlight extraction method based on multi-dimensional information such as machine visual and speech recognition, to efficiently and interpretably generate a highlight. As shown in FIG. 1, the method includes the following steps.

Step 101. Obtain a to-be-processed online class video and a teacher-student interaction feature, and divide the to-be-processed online class video into a plurality of target videos. The teacher-student interaction feature includes a reward and a punishment of a teacher to a student at each moment in the to-be-processed online class video.

Step 102. For any target video, respectively perform facial expression analysis, eye movement attention analysis, and gesture and body movement analysis on pictures corresponding to all frames of the target video, to obtain a visual feature set of a student and a visual feature set of a teacher in the pictures corresponding to the frames. The visual feature set includes an expression feature, an eye ball position feature, an eye aspect ratio feature, a gesture feature, a body movement feature, and an attention feature.

Step 103. Determine timeliness of student feedback according to a time interval between a speech segment corresponding to the student and a speech segment corresponding to the teacher in audio of the target video.

Step 104. Perform speech recognition on the speech segment corresponding to the student and the speech segment corresponding to the teacher and extract a key word, to determine fluency of language of the teacher, fluency of language of the student, and correctness of teaching knowledge.

Step 105. Determine a highlight in the to-be-processed online class video according to priorities of the target videos. The priority is a weighted sum of frequencies of occurrence of features of a feature set in the target video and/or a weighted sum of probability density of occurrence of features of a feature set in the target video. The feature set includes the teacher-student interaction feature, the visual feature set of the teacher, the visual feature set of the student, the timeliness of the student feedback, the fluency of the language of the teacher, the fluency of the language of the student, and the correctness of the teaching knowledge, and a weight of each feature is set according to a degree of importance of a feature in a requirement.

In an actual application, the respectively performing facial expression analysis, eye movement attention analysis, and gesture and body movement analysis on pictures corresponding to all frames of the target video, to obtain a visual feature set of a student and a visual feature set of a teacher in the pictures corresponding to the frames of the target video specifically includes the following cases.

The target video is read frame by frame, to obtain the pictures corresponding to all the frames of the target video. Specifically, a video is read frame by frame through opencv, and each frame of video is read as a picture.

For any picture, the facial expression analysis, the eye movement attention analysis, and the gesture and body movement analysis are respectively performed on a first setting region in the picture, to obtain the visual feature set of the teacher corresponding to the picture.

The facial expression analysis, the eye movement attention analysis, and the gesture and body movement analysis are respectively performed on a second setting region in the picture, to obtain the visual feature set of the student corresponding to the picture.

In an actual application, the performing the facial expression analysis, the eye movement attention analysis, and the gesture and body movement analysis on a picture, to obtain a visual feature set of the student corresponding to a picture is specifically as follows.

Face recognition: A face in a picture may be recognized by using a face recognition algorithm, and key points on the face are automatically marked. For example, a position of a face and feature points on the face may be outputted by using a dlib algorithm.

Expression analysis: A neural network model is trained by using a marked data set, pictures are inputted and expressions corresponding to the pictures are outputted, and the pictures including faces are classified by using the trained neural network model and probabilities of the expressions are outputted, where the neural network model may adopt a ResNet, a MobileNet, or the like.

Attention analysis is performed by using facial features such as a position of an eye ball and an eye aspect ratio of a person, to obtain attention. The eye aspect ratio EAR may be calculated by using key points on a face according to the following formula:

$$EAR = \frac{\|P_2 - P_6\| + \|P_3 - P_5\|}{2\|P_1 - P_4\|}$$

where from EAR to $P_6$ are all key points in an eye: $P_1$ and $P_4$ are respectively at a left side and a right side of the eye, $P_2$ and $P_3$ are respectively at a upper left position and upper right position of the eye, and $P_6$ and $P_5$ are respectively at a lower left and lower right position of the eye.

A position of the eye is found by using the key points on the face, and then the position of the eye ball is found by using a difference between a color of the eye ball and a color of the eye white.

Positions of an upper lip and a lower lip are found by using the key points on the face, and a mouth opening degree is calculated. A speaking condition of a student in a class may be evaluated according to a change curve of the mouth opening degree over time.

A gesture and a body movement of a person are recognized by using a machine learning model: First, to save a calculation time, a frame in which a hand occurs and a relative position of the hand need to be recognized through MobileNet or Mask RCNN. Subsequently, pictures including the hand are classified, and a probability of a gesture is outputted. Gesture classification may be considered as picture classification or video classification. If the gesture classification is considered as the picture classification, a single video frame is inputted into a classification model. If the gesture classification is considered as the video classification, continuous video frames are inputted into the model. The pictures or the videos may be classified by using a neural network model such as ResNet or DenseNet.

In an actual application, a calculation formula of probability density F(t1, t2) of occurrence of a feature in a target video (a time period from t1 to t2) is:

$$F(t1, t2) = \int_{t1}^{t2} f(t)d(t)$$

where f(t) is a feature function changing over a time t.

In an actual application, a frequency $F^{Happy}$ of occurrence of a happy expression within a period of time is used as an example, and a calculation formula is as follows:

$$F^{Happy} = \frac{Frame_{t1<t<t2}^{P_{Happy}>0.5}}{Frame_{t1<t<t2}}$$

where $Frame_{t1<t<t2}$ represents a total quantity of frames within the time period from t1 to t2, $Frame_{t1<t<t2}^{P_{Happy}>0.5}$ is a quantity of frames of a happy expression of a student within the time period from t1 to t2, and a standard for determining that the student has the happy expression in a frame is that: a happy probability $P_{Happy}$ outputted by a model is greater than 0.5.

In an actual application, a calculation formula of a weighted sum $F_{all}^{t1-t2}$ is as follows:

$$F_{all}^{t1-t2} = \sum_{i=1}^{n} W_i F_i^{t1-t2},$$

where $$F_{all}^{t1-t2} = \sum_{i=1}^{n} W_i F_i^{t1-t2}$$

represents a value obtained through calculation by using the probability density formula or the frequency formula within the time period from t1 to t2, and $W_i$ is weight corresponding to a feature.

Figure 2:
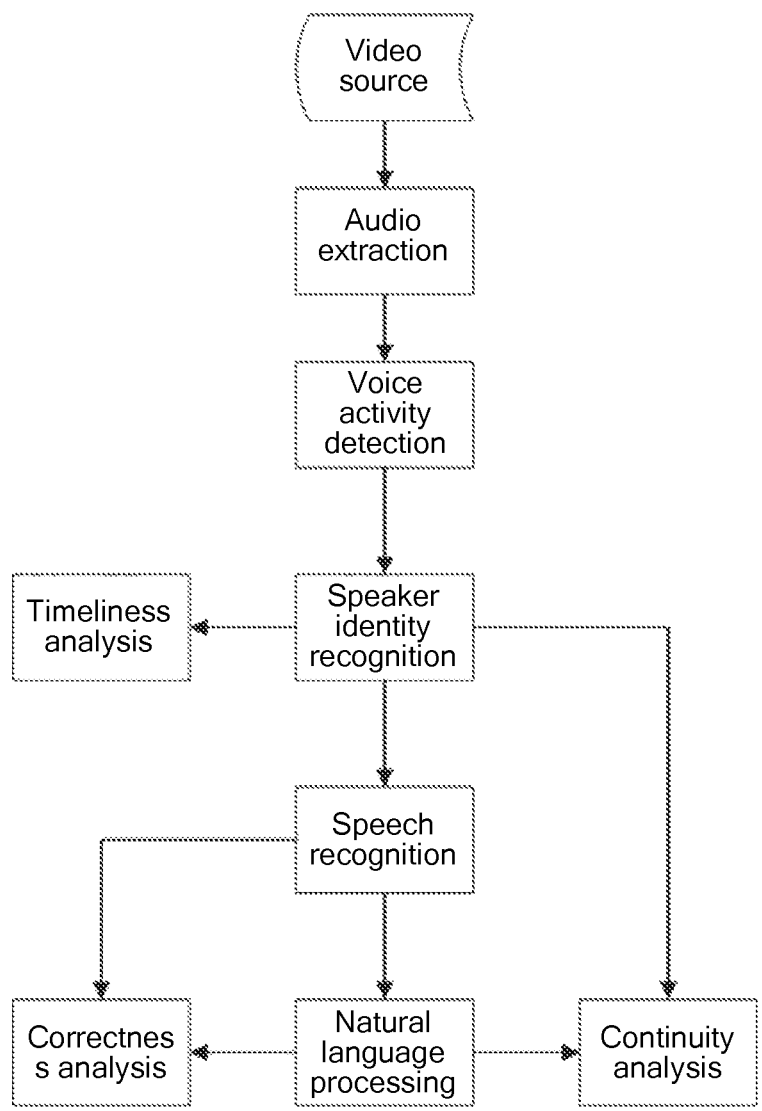
FIG. 2 is a flowchart of determining timeliness of student feedback, fluency of language of a teacher, fluency of language of a student, and correctness of teaching knowledge according to an embodiment of the present disclosure.

In an actual application, as shown in FIG. 2, the determining timeliness of student feedback according to a time interval between a speech segment corresponding to the student and a speech segment corresponding to the teacher in audio of the target video specifically includes the following cases.

Audio in the to-be-processed online class video is extracted. A voice may be extracted by using a tool such as ffmpeg or MoviePy, and the voice is stored in a memory or a hard disk in a format of way or MP3;

Voice activity detection is performed on the audio, to obtain a plurality of speech segments.

Identity recognition is performed on each speech segment, to obtain an identity corresponding to each speech segment.

The timeliness of the student feedback is determined according to the time interval between the speech segment corresponding to the student and the speech segment corresponding to the teacher. A time period at which a teacher and a student speak may be obtained, and whether the student gives a timely response to teaching content of the teacher is measured according to the following formula.

$$J=Distance(T_{student}, T_{teacher})$$

In the formula, interaction timeliness may be obtained by measuring a distance J between a time period $T_{teacher}$ at which the teacher speaks and a time period $T_{student}$ at which the student speaks. If the distance is too far, it indicates that the student does not give a timely feedback to the teaching content of the teacher.

In an actual application, as shown in FIG. 2, the performing speech recognition on the speech segment corresponding to the student and the speech segment corresponding to the teacher and extracting a key word, to determine fluency of language of the teacher, fluency of language of the student, and correctness of teaching knowledge specifically includes the following cases.

Speech recognition is respectively performed on the speech segment corresponding to the student and the speech segment corresponding to the teacher, to obtain a text corresponding to the student and a text corresponding to the teacher, where the speech recognition may be performed by using a machine learning model such as a hidden Markov model, a Gaussian mixture model, or a neural network model or by using a commercial speech recognition API.

A key word in the text corresponding to the teacher is extracted, where content analysis is performed on a converted text, to extract the key word in the text corresponding to the teacher. Specifically, word segmentation is performed on a text to which a speech is converted (Jieba may be adopted for a word segmentation tool), key words of people are obtained by extracting the key words and analyzing emotion of the words (a convolution neural network may be adopted for word emotion analysis), where the key words include, but are not limited to: emotion, "You are so good", "You are too bad", prohibited words, course knowledge point, "Um", "This", and the like.

The fluency of the language of the teacher is determined according to the key word. Specifically, when the key word extracted from the text corresponding to the teacher belongs to a first preset word set, it is determined that the fluency of the language of the teacher is low. For example, if there are a lot of pause times or meaningless words such as "um" and "this" during teaching of the teacher, it can be considered that continuity of teaching of the teacher is not high and the fluency of language of the teacher is low.

The correctness of the teaching knowledge is determined according to the text corresponding to the student. Specifically, the text corresponding to the student is compared with a stored standard text, and when a result of comparison is that a similarity between the text corresponding to the student and the stored text is low, it is determined that the correctness of the teaching knowledge mastered by the student is low. For example, it may be found that pronunciation of the student is not standard during reading by using a speech recognition technology, and wrong sentences during reading of the student may be found by using a natural language processing technology, so that it is determined that correctness of teaching knowledge mastered by the student is relatively low.

The fluency of the language of the student is determined according to the speech segment corresponding to the student. Specifically, when a time interval between each word in the speech segment corresponding to the student exceeds a set time interval, it is determined that the fluency of the language of the student is low. For example, during reading, if a student pauses a lot when reading the text, it is considered that continuity of reading of the student is not high and fluency of language of the student is low.

Optionally, the determining a highlight in the to-be-processed online class video according to priorities of the target videos specifically includes the following cases.

For any target video, a weighted sum of frequencies of occurrence of features of a feature set in the target video or a weighted sum of probability density of occurrence of features of a feature set in the target video is calculated.

A target video corresponding to a target priority is determined as the highlight, where the target priority is a weighted sum with a value in a set range.

Figure 3:
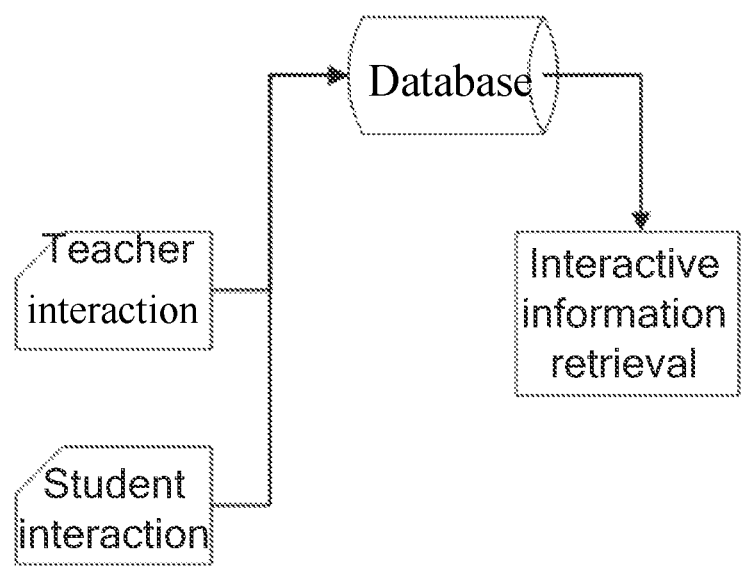
FIG. 3 is a flowchart of obtaining a teacher-student interaction feature according to an embodiment of the present disclosure.

In an actual application, as shown in FIG. 3, when interactive evaluation content can be obtained, the interactive evaluation content is retrieved from a server, and time stamps including positive interactive evaluation and negative interactive evaluation are extracted to form the teacher-student interaction feature. In an online class, teachers and students will interact through buttons on video software. For example, if a student performs well, a teacher will give the student "praise" and "a little red flower", and these operations and times of occurrence will be recorded in a database. If interactive information needs to be retrieved for highlight moment calculation, the interactive information and a time stamp of occurrence of the interactive information in a course can be retrieved from the database and used as a teacher-student interaction feature to form a highlight moment.

In an actual application, the method further includes: generating a plurality of short videos from a long video by using a video clipping tool according to the highlight.

This embodiment further provides a video highlight extraction system, including:

an obtaining module A1, configured to obtain a to-be-processed online class video and a teacher-student interaction feature, and divide the to-be-processed online class video into a plurality of target videos, where the teacher-student interaction feature includes a reward and a punishment of a teacher to a student at each moment in the to-be-processed online class video;

a visual feature set determining module A2, configured to: for any target video, respectively perform facial expression analysis, eye movement attention analysis, and gesture and body movement analysis on pictures corresponding to all frames of the target video, to obtain a visual feature set of the student and a visual feature set of the teacher in the pictures corresponding to the frames, where the visual feature set includes an expression feature, an eye ball position feature, an eye aspect ratio feature, a gesture feature, a body movement feature, and an attention feature;

a timeliness determining module A3, configured to determine timeliness of student feedback according to a time interval between a speech segment corresponding to the student and a speech segment corresponding to the teacher in audio of the target video;

a fluency and correctness determining module A4, configured to perform speech recognition on the speech segment corresponding to the student and the speech segment corresponding to the teacher and extract a key word, to determine fluency of language of the teacher, fluency of language of the student, and correctness of teaching knowledge; and a highlight determining module A5, configured to determine a highlight in the to-be-processed online class video according to priorities of the target videos, where the priority is a weighted sum of frequencies of occurrence of features of a feature set in the target video and/or a weighted sum of probability density of occurrence of features of a feature set in the target video, and the feature set includes the teacher-student interaction feature, the visual feature set of the teacher, the visual feature set of the student, the timeliness of the student feedback, the fluency of the language of the teacher, the fluency of the language of the student, and the correctness of the teaching knowledge.

In an actual application, the visual feature set determining module specifically includes:

a picture extraction unit, configured to read the target video frame by frame, to obtain the pictures corresponding to all the frames of the target video;

a teacher-specific visual feature set determining unit, configured to for any picture, respectively perform the facial expression analysis, the eye movement attention analysis, and the gesture and body movement analysis on a first setting region in the picture, to obtain the visual feature set of the teacher corresponding to the picture; and a student-specific visual feature set determining unit, configured to respectively perform the facial expression analysis, the eye movement attention analysis, and the gesture and body movement analysis on a second setting region in the picture, to obtain the visual feature set of the student corresponding to the picture.

In an actual application, the timeliness determining module specifically includes:

an audio extraction unit, configured to extract audio in the to-be-processed online class video;

a speech segment determining unit, configured to perform voice activity detection on the audio, to obtain a plurality of speech segments;

an identity determining unit, configured to perform identity recognition on each speech segment, to obtain an identity corresponding to each speech segment; and a timeliness determining unit, configured to determine the timeliness of the student feedback according to the time interval between the speech segment corresponding to the student and the speech segment corresponding to the teacher.

In an actual application, the fluency and correctness determining module specifically includes:

a speech recognition unit, configured to respectively perform speech recognition on the speech segment corresponding to the student and the speech segment corresponding to the teacher, to obtain a text corresponding to the student and a text corresponding to the teacher;

a key word extraction unit, configured to extract a key word in the text corresponding to the teacher;

a teacher fluency determining unit, configured to determine the fluency of the language of the teacher according to the key word;

a correctness determining unit, configured to determine the correctness of the teaching knowledge according to the text corresponding to the student; and a student fluency determining unit, configured to determine the fluency of the language of the student according to the speech segment corresponding to the student.

This embodiment further provides a storage medium, configured to store the foregoing video highlight extraction method.

The present disclosure has the following advantages.

1. Relatively strong interpretability is achieved, and a user conveniently adjusts a parameter as required.

2. With a fast speed, a long video can be analyzed and clipped within a relatively short time, and the hours of video are concentrated through clipping, to save system resources and facilitate a user to quickly obtain a result.

3. It can help improve the educational quality of classroom, and help parents better understand student learning.

Each embodiment of this specification is described in a progressive manner, each embodiment focuses on the difference from other embodiments, and the same and similar parts between the embodiments may refer to each other. The system disclosed in the embodiments corresponds to the method disclosed in the embodiments. Therefore, the system is described in a relatively simple manner. For the related parts, reference may be made to the description of the method parts.

In this specification, several specific embodiments are used for illustration of the principles and implementations of the present disclosure. The description of the foregoing embodiments is used to help illustrate the method of the present disclosure and the core ideas thereof. In addition, persons of ordinary skill in the art can make various modifications in terms of specific implementations and the scope of application in accordance with the ideas of the present disclosure. In conclusion, the content of this specification shall not be construed as a limitation to the present disclosure.

What is claimed is:

1. A video highlight extraction method, comprising:
obtaining a to-be-processed online class video and a teacher-student interaction feature, and dividing the to-be-processed online class video into a plurality of target videos, wherein the teacher-student interaction feature comprises a plurality of interactions between a teacher and a student, and a plurality of time stamps corresponding to occurrence of the plurality of interactions in the to-be-processed online class video;
for any target video, respectively performing facial expression analysis, eye movement attention analysis, and gesture and body movement analysis on pictures corresponding to all frames of the target video, to obtain a visual feature set of the student and a visual feature set of the teacher in the pictures corresponding to the frames, wherein the visual feature set of the student and the visual feature set of the teach both comprise an expression feature, an eye ball position feature, an eye aspect ratio feature, a gesture feature, a body movement feature, and an attention feature;
determining timeliness of student feedback according to a time interval between a speech segment corresponding to the student and a speech segment corresponding to the teacher in audio of the target video;
performing speech recognition on the speech segment corresponding to the student and the speech segment corresponding to the teacher and extracting a key word, to determine fluency of language of the teacher, fluency of language of the student, and correctness of teaching knowledge;
determining a highlight in the to-be-processed online class video according to priorities of the target videos, comprising:
calculating, for any target video, a weighted sum of frequencies of occurrences of features a feature set in the target video of a weighted sum of probability density of occurrence of feature of a feature set in the target video;
determining a target video corresponding to a target priority as the highlight, wherein the target priority is a weighted sum with a value in a set range; and
wherein the priority is a weighted sum of frequencies of occurrence of features of a feature set in the target video and/or a weighted sum of probability density of occurrence of features of a feature set in the target video, and the feature set comprises the teacher-student interaction feature, the visual feature set of the teacher, the visual feature set of the student, the timeliness of the student feedback, the fluency of the language of the teacher, the fluency of the language of the student, and the correctness of the teaching knowledge.

2. The video highlight extraction method according to claim 1, wherein the respectively performing facial expression analysis, eye movement attention analysis, and gesture and body movement analysis on pictures corresponding to all frames of the target video, to obtain a visual feature set of the student and a visual feature set of the teacher in the pictures corresponding to the frames specifically comprises:
reading the target video frame by frame, to obtain the pictures corresponding to all the frames of the target video;
for any picture, respectively performing the facial expression analysis, the eye movement attention analysis, and the gesture and body movement analysis on a first setting region in the picture, to obtain the visual feature set of the teacher corresponding to the picture; and
respectively performing the facial expression analysis, the eye movement attention analysis, and the gesture and body movement analysis on a second setting region in the picture, to obtain the visual feature set of the student corresponding to the picture.

3. The video highlight extraction method according to claim 1, wherein the determining timeliness of student feedback according to a time interval between a speech segment corresponding to the student and a speech segment corresponding to the teacher in audio of the target video specifically comprises:
extracting audio in the to-be-processed online class video;
performing voice activity detection on the audio, to obtain a plurality of speech segments;
performing identity recognition on each speech segment, to obtain an identity corresponding to each speech segment; and
determining the timeliness of the student feedback according to the time interval between the speech segment corresponding to the student and the speech segment corresponding to the teacher.

4. The video highlight extraction method according to claim 1, wherein the performing speech recognition on the speech segment corresponding to the student and the speech segment corresponding to the teacher and extracting a key word, to determine fluency of language of the teacher, fluency of language of the student, and correctness of teaching knowledge specifically comprises:

respectively performing speech recognition on the speech segment corresponding to the student and the speech segment corresponding to the teacher, to obtain a text corresponding to the student and a text corresponding to the teacher;

extracting a key word in the text corresponding to the teacher;

determining the fluency of the language of the teacher according to the key word;

determining the correctness of the teaching knowledge according to the text corresponding to the student; and determining the fluency of the language of the student according to the speech segment corresponding to the student.

5. A video highlight extraction system, comprising:

an obtaining module, configured to obtain a to-be-processed online class video and a teacher-student interaction feature, and divide the to-be-processed online class video into a plurality of target videos, wherein the teacher-student interaction feature comprises a plurality of interactions between a teacher and a student, and a plurality of time stamps corresponding to occurrence of the plurality of interaction in the to-be-processed online class video;

a visual feature set determining module, configured to: for any target video, respectively perform facial expression analysis, eye movement attention analysis, and gesture and body movement analysis on pictures corresponding to all frames of the target video, to obtain a visual feature set of the student and a visual feature set of the teacher in the pictures corresponding to the frames, wherein the visual feature set of the student and the visual feature set of the teacher both comprise an expression feature, an eye ball position feature, an eye aspect ratio feature, a gesture feature, a body movement feature, and an attention feature;

a timeliness determining module, configured to determine timeliness of student feedback according to a time interval between a speech segment corresponding to the student and a speech segment corresponding to the teacher in audio of the target video;

a fluency and correctness determining module, configured to perform speech recognition on the speech segment corresponding to the student and the speech segment corresponding to the teacher and extract a key word, to determine fluency of language of the teacher, fluency of language of the student, and correctness of teaching knowledge;

a highlight determining module, comprising:

a weighted sum of frequencies of occurrences of features of a feature set in the target video for any target video or a weighted sum of probability density of occurrences of features of a feature set in the target video for any target video;

a target video corresponding to a target priority as the highlight, wherein the target priority is a weighed sum with a value in a set range; and wherein the feature set comprises the teacher-student interaction feature, the visual feature set of the teacher, the visual feature set of the student, the timeliness of the student feedback, the fluency of the language of the teacher, the fluency of the language of the student, and the correctness of the teaching knowledge.

6. The video highlight extraction system according to claim 5, wherein the visual feature set determining module specifically comprises:

a picture extraction unit, configured to read the target video frame by frame, to obtain the pictures corresponding to all the frames of the target video;

a teacher-specific visual feature set determining unit, configured to: for any picture, respectively perform the facial expression analysis, the eye movement attention analysis, and the gesture and body movement analysis on a first setting region in the picture, to obtain the visual feature set of the teacher corresponding to the picture; and a student-specific visual feature set determining unit, configured to respectively perform the facial expression analysis, the eye movement attention analysis, and the gesture and body movement analysis on a second setting region in the picture, to obtain the visual feature set of the student corresponding to the picture.

7. The video highlight extraction system according to claim 5, wherein the timeliness determining module specifically comprises:

an audio extraction unit, configured to extract audio in the to-be-processed online class video;

a speech segment determining unit, configured to perform voice activity detection on the audio, to obtain a plurality of speech segments;

an identity determining unit, configured to perform identity recognition on each speech segment, to obtain an identity corresponding to each speech segment; and a timeliness determining unit, configured to determine the timeliness of the student feedback according to the time interval between the speech segment corresponding to the student and the speech segment corresponding to the teacher.

8. The video highlight extraction system according to claim 5, wherein the fluency and correctness determining module specifically comprises:

a speech recognition unit, configured to respectively perform speech recognition on the speech segment corresponding to the student and the speech segment corresponding to the teacher, to obtain a text corresponding to the student and a text corresponding to the teacher;

a key word extraction unit, configured to extract a key word in the text corresponding to the teacher;

a teacher fluency determining unit, configured to determine the fluency of the language of the teacher according to the key word;

a correctness determining unit, configured to determine the correctness of the teaching knowledge according to the text corresponding to the student; and a student fluency determining unit, configured to determine the fluency of the language of the student according to the speech segment corresponding to the student.

9. A non-transitory storage medium, configured to store the video highlight extraction method according to claim 1.

10. The non-transitory storage medium according to claim 9, wherein the respectively performing facial expression analysis, eye movement attention analysis, and gesture and body movement analysis on pictures corresponding to all frames of the target video, to obtain a visual feature set of the student and a visual feature set of the teacher in the pictures corresponding to the frames specifically comprises:

reading the target video frame by frame, to obtain the pictures corresponding to all the frames of the target video;

for any picture, respectively performing the facial expression analysis, the eye movement attention analysis, and the gesture and body movement analysis on a first setting region in the picture, to obtain the visual feature set of the teacher corresponding to the picture; and respectively performing the facial expression analysis, the eye movement attention analysis, and the gesture and body movement analysis on a second setting region in the picture, to obtain the visual feature set of the student corresponding to the picture.

11. The non-transitory storage medium according to claim 9, wherein the determining timeliness of student feedback according to a time interval between a speech segment corresponding to the student and a speech segment corresponding to the teacher in audio of the target video specifically comprises:

extracting audio in the to-be-processed online class video;

performing voice activity detection on the audio, to obtain a plurality of speech segments;

performing identity recognition on each speech segment, to obtain an identity corresponding to each speech segment; and determining the timeliness of the student feedback according to the time interval between the speech segment corresponding to the student and the speech segment corresponding to the teacher.

12. The non-transitory storage medium according to claim 9, wherein the performing speech recognition on the speech segment corresponding to the student and the speech segment corresponding to the teacher and extracting a key word, to determine fluency of language of the teacher, fluency of language of the student, and correctness of teaching knowledge specifically comprises:

respectively performing speech recognition on the speech segment corresponding to the student and the speech segment corresponding to the teacher, to obtain a text corresponding to the student and a text corresponding to the teacher;

extracting a key word in the text corresponding to the teacher;

determining the fluency of the language of the teacher according to the key word;

determining the correctness of the teaching knowledge according to the text corresponding to the student; and determining the fluency of the language of the student according to the speech segment corresponding to the student.

* * * * *